United States Patent [19]
Tomlinson

[11] Patent Number: 4,950,208
[45] Date of Patent: Aug. 21, 1990

[54] VARIABLE RATIO POWER TRANSMISSION

[76] Inventor: Malcolm Tomlinson, 245 Turnpike Drive, Luton, Bedfordshire LU3 3RG, England

[21] Appl. No.: 367,162

[22] Filed: Jun. 16, 1989

[30] Foreign Application Priority Data

Jun. 17, 1988 [GB] United Kingdom ............... 8814525
Apr. 4, 1989 [GB] United Kingdom ............... 8907524
Apr. 28, 1989 [GB] United Kingdom ............... 8909830

[51] Int. Cl.$^5$ .................... F16H 9/00; F16H 11/00
[52] U.S. Cl. .................................... 474/71; 474/29
[58] Field of Search ........................... 474/69–71, 474/11, 12, 17, 18, 29–35; 74/856, 865–869

[56] References Cited

U.S. PATENT DOCUMENTS 3,715,928  2/1973  Case et al. ................... 474/29 X
4,922,719  2/1988  Klopfenstein ................. 474/29 X Primary Examiner—Thuy M. Bui
Attorney, Agent, or Firm—Panitch Schwarze Jacobs & Nadel

[57] ABSTRACT

A variable ratio power transmission comprising a variator and a geared drive operable in parallel along respective loading paths which unite at at least one gearset. In a first embodiment, the variator is rewindable between its ratio extremities of operation to begin a successive variable mode, while full power drive is maintained through an associated geartrain at substantially the same overall transmission ratio, thereby facilitating substantially stepless transition between successive modes. In a second embodiment, the input to a variator is switchable between its drivable elements at the ratio extremities of operation thereof to begin a successive variable mode, while full power drive is maintained through an associated geartrain at substantially the same overall transmission ratio, again facilitating substantially stepless transition between successive modes. A third embodiment provides power input to a variator at its ratio extremities of operation to begin successive variable modes, the input being switchable to another variator at its opposed ratio extremity of operation at substantially the same overall transmission ratio, once again facilitating substantially stepless transition between successive modes. The inventive transmission reduces torque and power loading upon the variator(s) and provides stepless extension of variator ratio spreads.

31 Claims, 14 Drawing Sheets

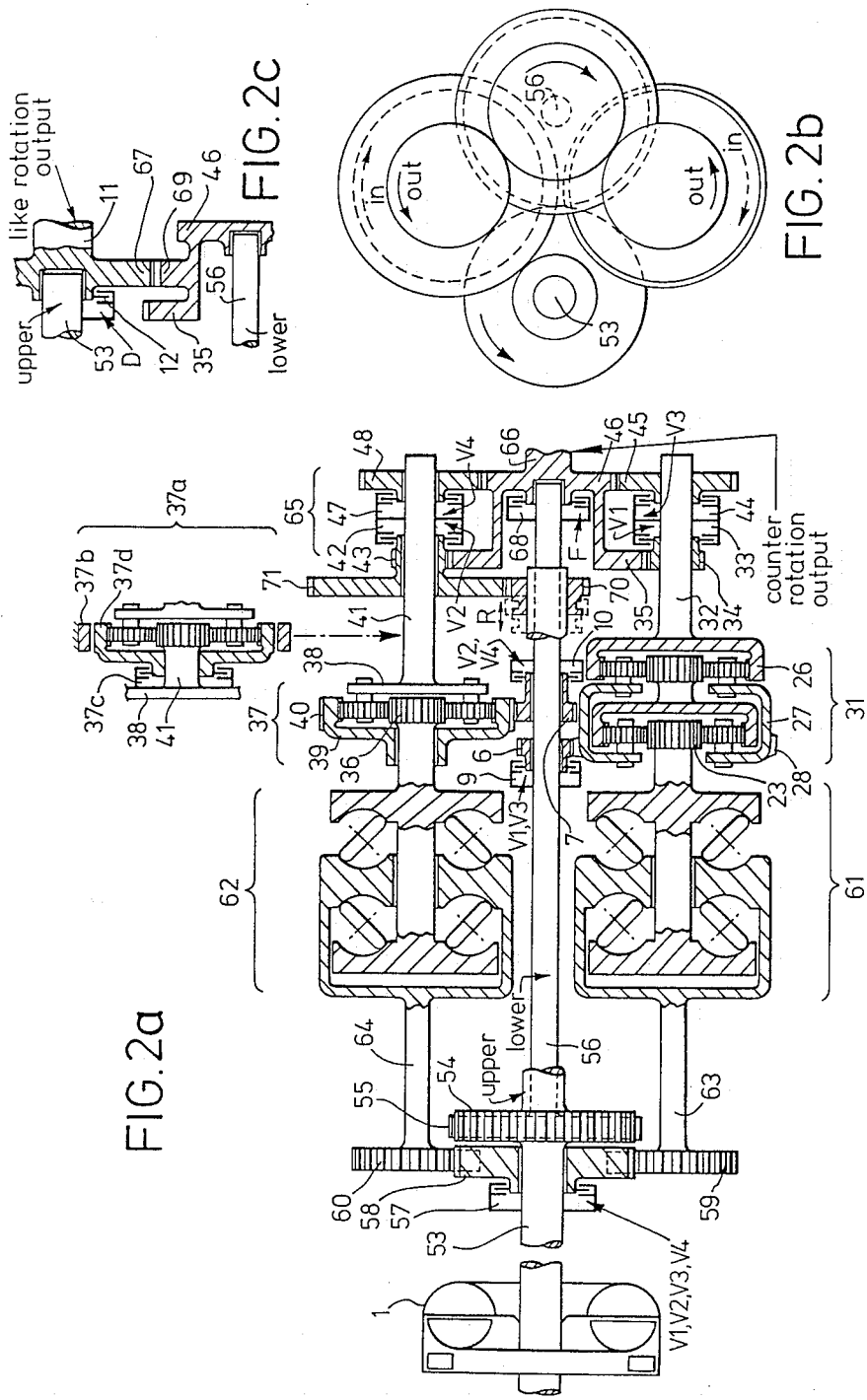

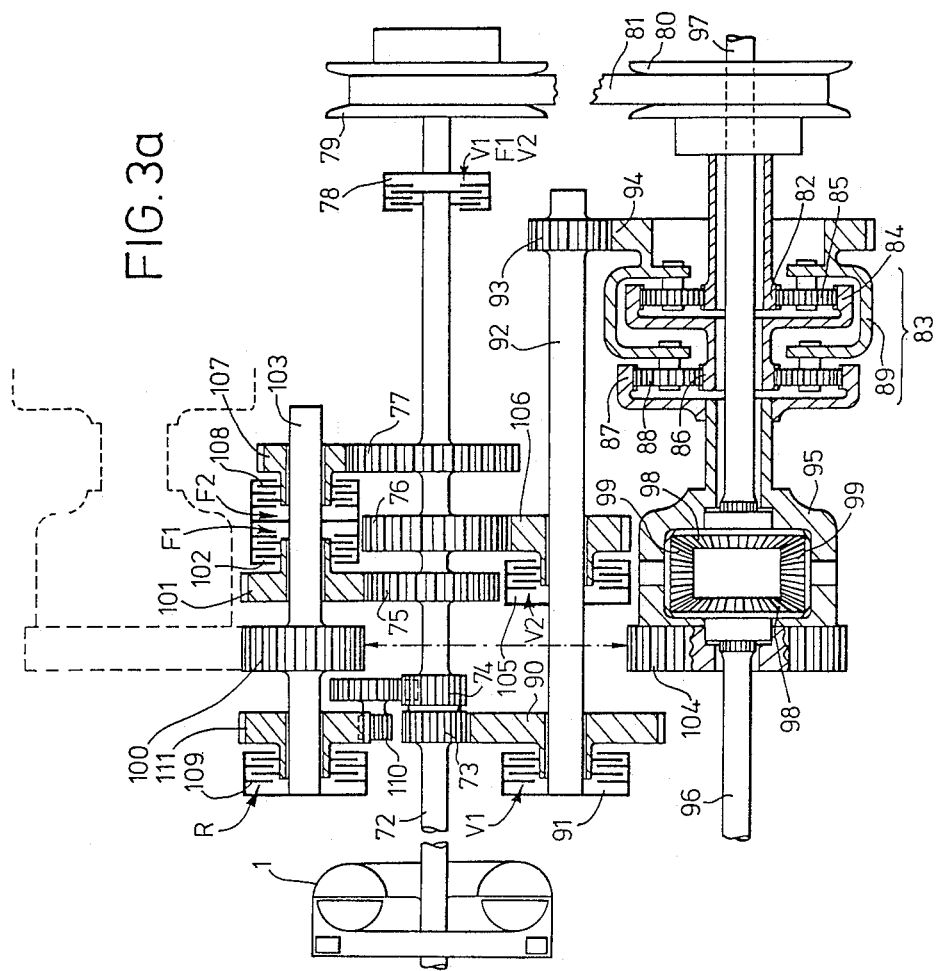

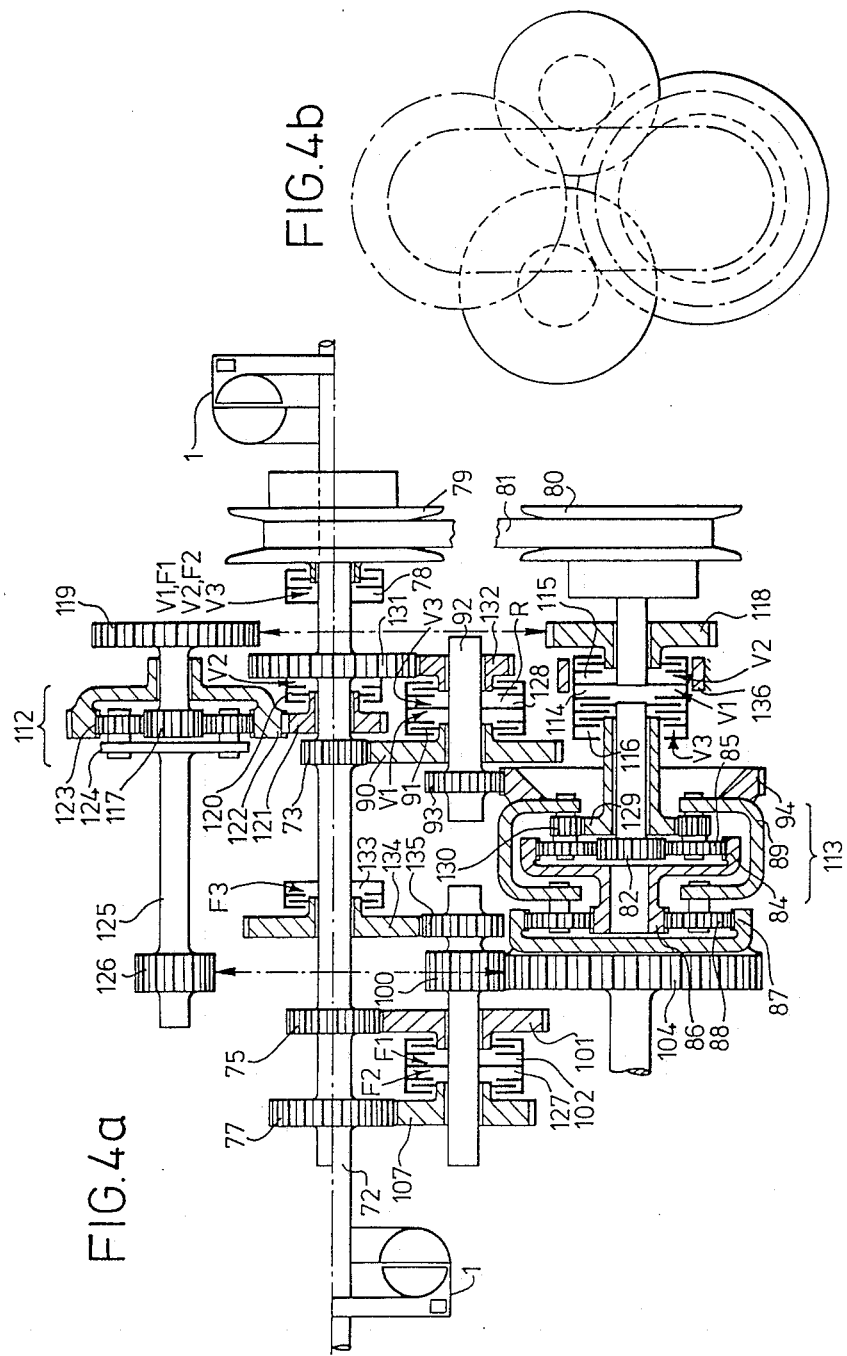

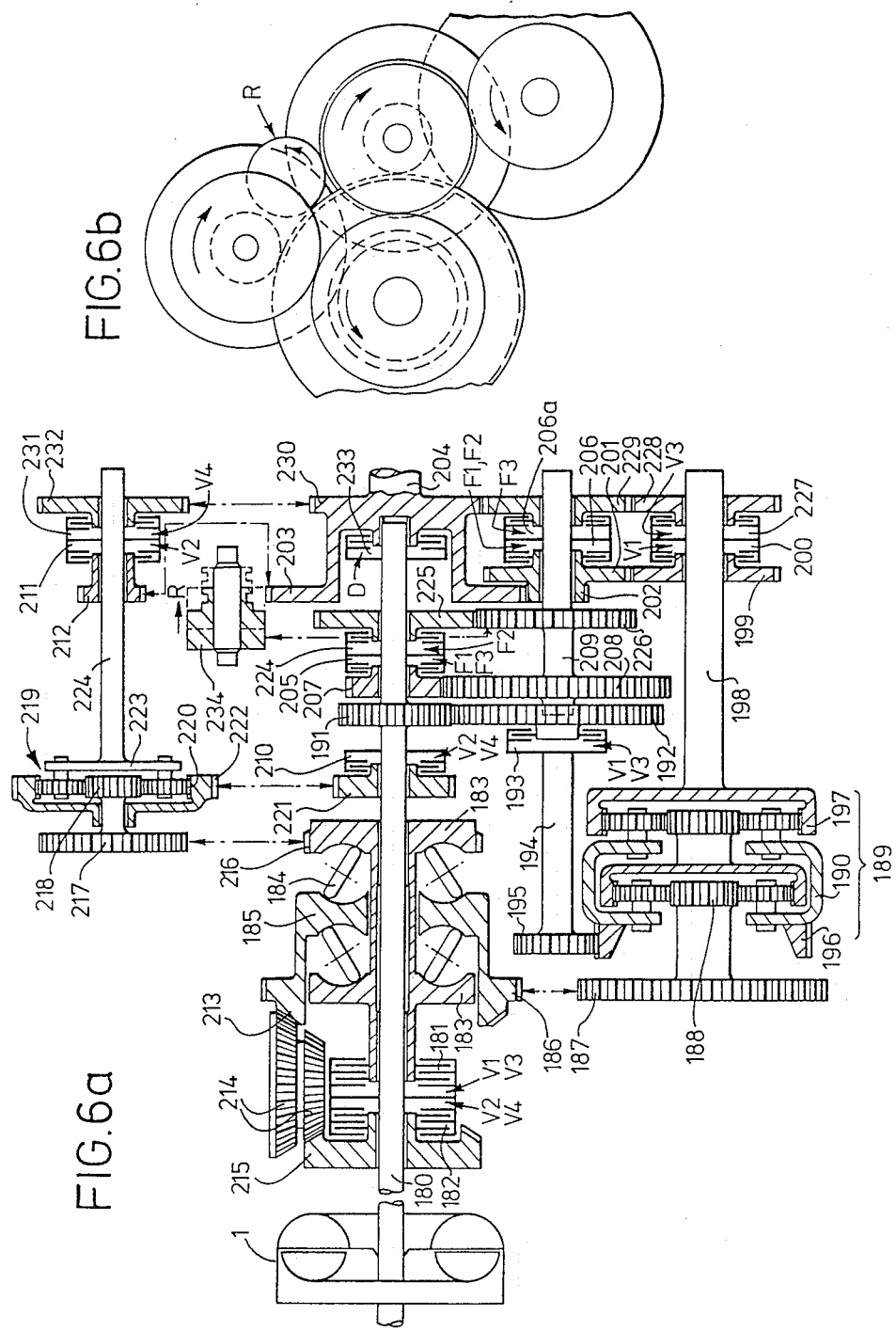

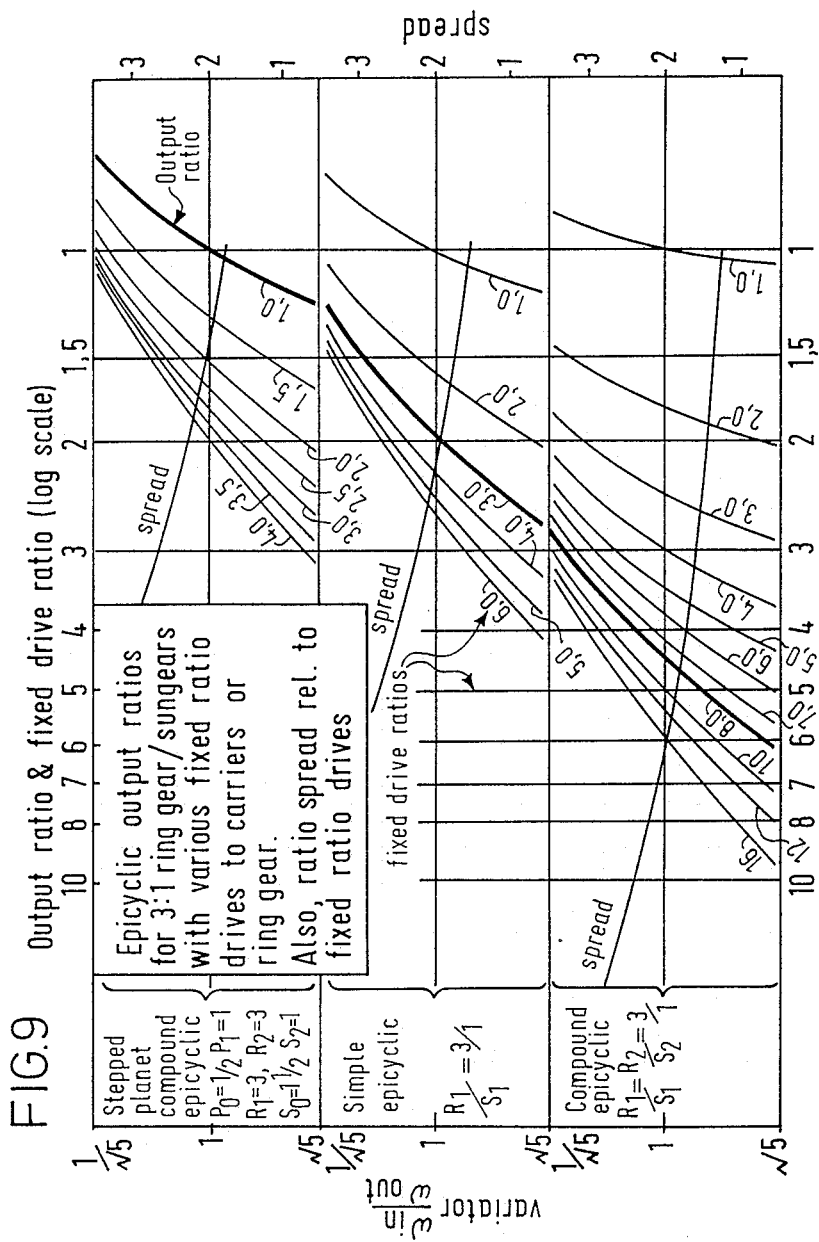

EXAMPLE SHOWING EFFECT OF WIDER RATIO SPREADS

GRAPHS SHOWING TYPICAL REDUCTION IN VARIATOR POWER AND TRACTION FORCE WITH SEMI CVT VERSUS DIRECT CVT.

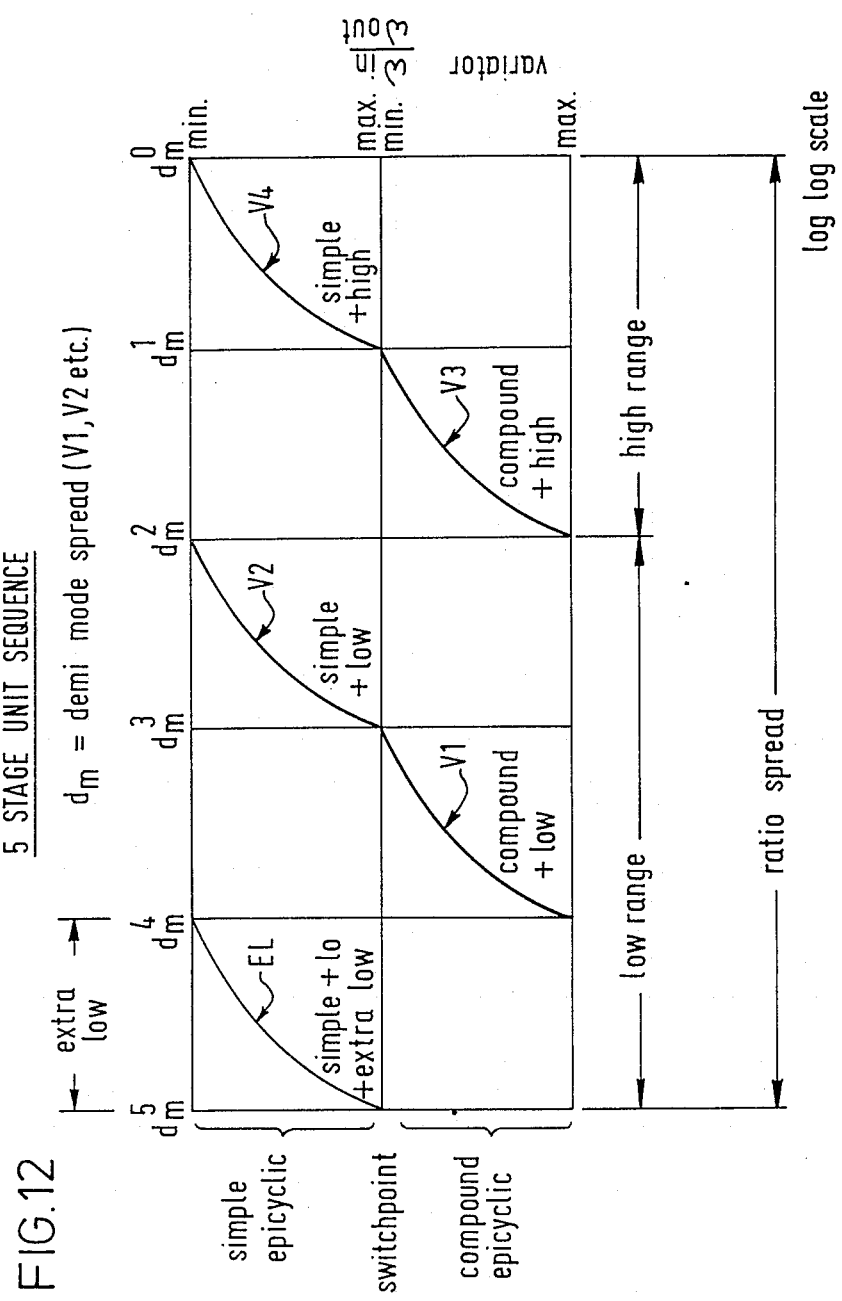

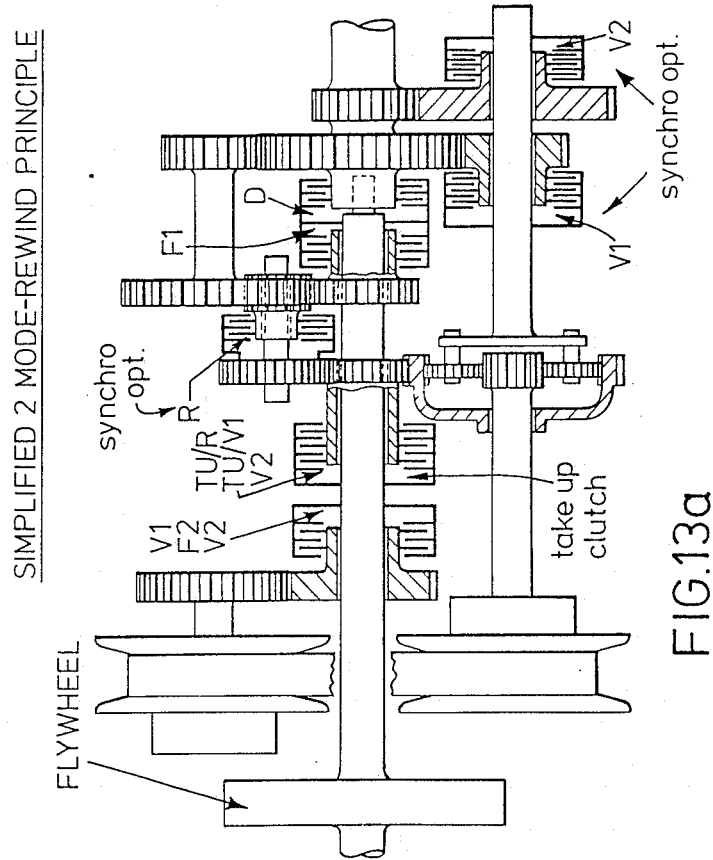
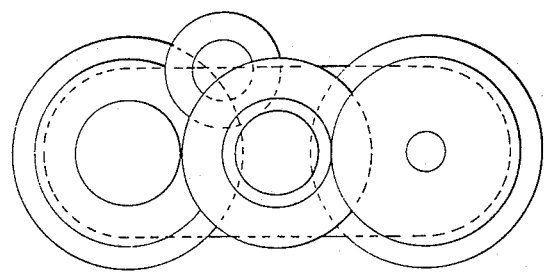

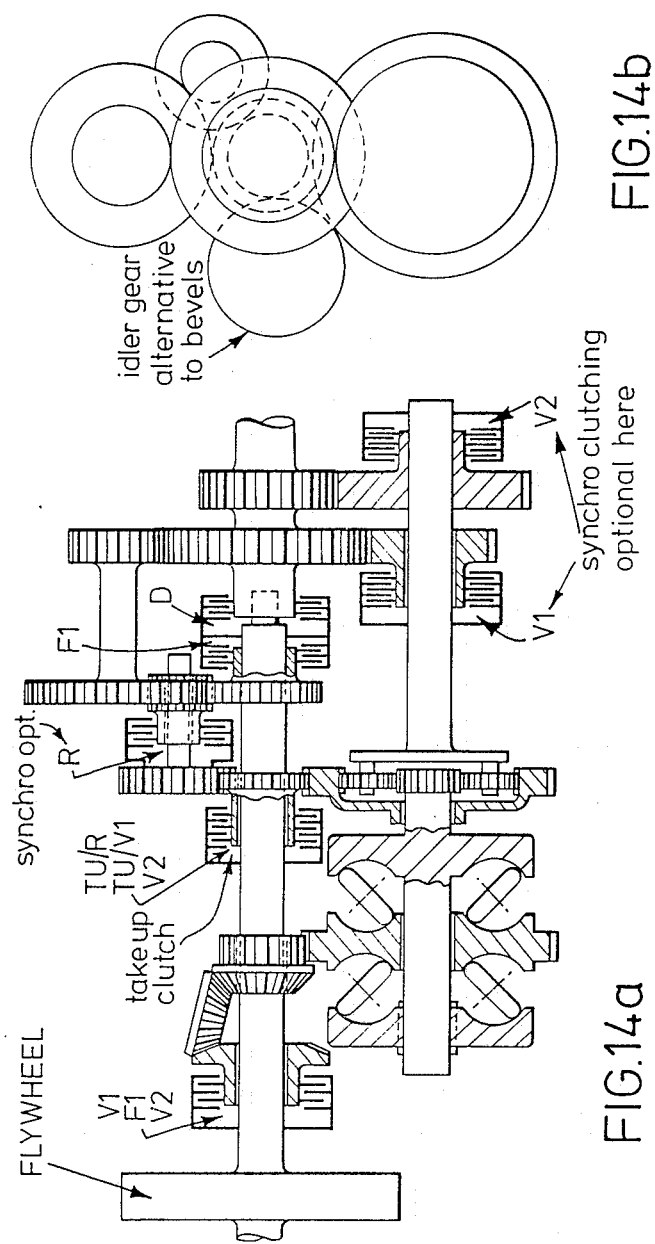

VARIABLE RATIO POWER TRANSMISSION

FIELD OF THE INVENTION

This invention relates to a variable ratio power transmission for motor vehicles.

BACKGROUND OF THE INVENTION

Known automatic transmissions for motor vehicles comprise predominantly torque converters in conjunction with stepped ratio epicyclic gearsets, which provide excellent take-up features and full power gearshifts.

There are, however, a number of drawbacks associated with such known transmissions, for example:

Efficiency

When multiplying torque, known automatic transmissions tend to be very inefficient, for instance, when a 3:1 stall torque unit is producing twice the input torque, its efficiency is, typically less than 70%. Such losses are acceptable on high power/weight ratio vehicles, e.g. large engined cars, since the condition is transient; whereas, with low power/weight ratio vehicles, e.g. trucks, the torque multiplication from the converter is required for extended periods when climbing steep hills, the consequential power losses being criticised by drivers and, also, demanding substantial oil cooling facilities.

Engine Braking

Most modern torque converters have a clutching facility which engages usually in only higher gears, to avoid slippage and heterodyning but which may provide limited engine (overrun) braking only in those gears. The incorporation of such a clutching facility in lower gears would induce shock loads during gearshifts and, as a possible consequence, damage to the transmission.

Furthermore, during overrun, an unclutched converter turbine will overrun the impeller which not only effectively reduces all gear ratios, including the already shallower first gear on automatics, but also may lead to overheating of the transmission fluid on prolonged downgrades.

Since engine braking is frequently required by trucks in lower gears, to avoid or reduce brake fade during steep descents and is often enhanced on diesel trucks by employing an exhaust brake, which is not available with conventional automatics, there is consequently more demand upon the basic power brake systems with torque converter-type automatic transmissions, which can only be alleviated by the incorporation of some form of retarder in the transmissions or separate retarder in addition, thereby resulting in extra costs.

Some alternatives to torque converter-type automatic transmissions are:

(a) electronically-controllable, stepped ratio, manually-shiftable gearboxes requiring electronic declutching during gearshifts and known as E.M.S. gearboxes; and (b) continuously variable transmissions referred to hereinafter as "CVTs", which usually have torque/power capacity and ratio spread limitations and are less efficient than gearsets at transmitting power but which can facilitate optimum engine r.p.m. and maximum engine braking over comparatively large, speed ranges.

SUMMARY OF THE INVENTION

It is an object of the present invention to provide a variable ratio power transmission which overcomes, or at least substantially reduces, the disadvantages discussed above in relation to known types of such transmission and which incorporates one or more variators.

It is another object of the invention to provide a variable ratio power transmission, and optionally a stepless variable ratio transmission, with increased capacity, ratio spread, engine braking and efficiency, thereby overcoming disadvantages associated with known automatic transmissions and direct variator-type CVTs.

In the broadest aspect, the invention is a variable ratio power transmission comprising a variator and a geared drive operable in parallel along respective loading paths which unite at at least one gearset, whereby the power transmitted by the variator, in use, is less than the total input power to the transmission.

Accordingly, one aspect of the invention resides in a variable ratio power transmission wherein a variator is rewindable between its ratio extremities of operation to begin a successive variable mode, whilst full power drive is maintained through an associated geartrain at substantially the same overall transmission ratio, thereby facilitating substantially stepless transition between successive variable modes.

A second aspect of the invention provides a variable ratio power transmission wherein input to a variator is switchable between its drivable elements at the ratio extremities of operation thereof to begin a successive variable mode, whilst full power drive is maintained through an associated geartrain at substantially the same overall transmission ratio, thereby facilitating substantially stepless transition between successive variable modes.

A further aspect of the invention resides in a variable ratio power transmission wherein power drive to a variator at its ratio extremities of operation to begin a successive variable mode is switchable to another variator at its opposed ratio extremity of operation at substantially the same overall transmision ratio, thereby facilitating substantially stepless transition between successive modes.

The speed of the drivable variator element of the second inventive transmission defined above, to which input power is switchable, can be synchronised with the speed of the drivable variator element from which input power is switchable.

An increase in the variator input or output speed may be arranged to provide a corresponding increase in the overall transmission input or output speed, for all the variable modes, while full power drive may be provided throughout the operating range of the transmission.

Also, the inventive transmission can transmit overrun torque without slippage over the full stepless operating range, thereby facilitating maximum braking of the associated engine. Indeed, the stepless nature and wide ratio spread of a transmission in accordance with the present invention facilitates optimum engine braking power from maximum speed down to, say, 3 m.p.h., the available retardation increasing exponentially as the associated vehicle speed reduces.

Preferably, constant variator belt loading or traction force is provided throughout the operating range(s) of the variator(s) and the ratio spreads of the variable modes can reduce variator loadings.

Advantageously, the ratio spreads of the variable modes can be arranged to produce different variator loadings for different ratio ranges, thereby lessening loadings over a frequently used ratio range.

Further, the inventive transmission may include a fixed ratio drive which is substantially equal to the ratio extremities of adjacent variable modes. In such an arrangement, the fixed ratio drive may be operable whilst the variable modes are being primed. Additionally, the ratio spreads of successive variable modes may be substantially the same and the speed(s) of the input(s) to the variators(s) can be compatible with the performance capacity of the variator(s). Moreover, a transmission in accordance with the invention may include a range change gearset for permitting repetition of at least one variable variator mode at a different output speed, thereby steplessly extending the overall ratio spread of the transmission.

For take-up-from-rest operation of the inventive transmission, a fluid, magnetic or centrifugal clutch, fluid flywheel, a flywheel-sited mechanical clutch or a wet clutch may be employed.

An increment may be provided between respective variable and fixed ratio modes or between adjacent variable modes, and a final fixed gear ratio may be used to unload the variator(s). Also, adjacent variable modes may be arranged to overlap.

An hydraulic power source may be disconnectable in any final fixed ratio mode, while an epicyclic reduction gearset can be used to provide an extra low variable mode.

In one embodiment of the inventive transmission, there is included a stepped planet compound epicyclic gearset arranged to switch the variator output from the smaller to the larger of two optional sungears of the gearset, to reduce the ratio thereof and alleviate reduction in the spread of the variable mode which would otherwise result from an increase in the output speed range through increasing the speed of the geared input to the epicyclic gearset.

Also, the inventive transmission may include a stepped planet compound epicyclic gearset whose larger sungear can be grounded to produce a reversed output to that of the associated carrier input.

Further, the variator input may be disconnectable by means of a conventional take-up clutch, to permit intermode, stepped gearshifts to be effected manually. At least one fixed ratio drive may be incorporated within the ratio spreads of the variable modes.

A fourth aspect of the invention provides a variable ratio power transmission comprising a variator and a geared drive operable in parallel along respective loading paths which unite at a gearset, preferably an epicyclic gearset.

Advantageously, the variable modes can be abutted, when generated by one or more variators, to produce a stepless extension of the associated ratio ranges, under full or continuous power input.

Also, clutching may be arranged to occur at substantially zero speed difference between respective elements of the transmission, thereby facilitating simultaneous application within separate drive paths thus avoiding "hot shifts". Whichever type of epicyclic gearset is used, for example, a simple epicyclic, compound epicyclic or compound epicyclic with optional sungears, it can be arranged, preferably with appropriate gearing in parallel, to produce complementary ratio ranges, to facilitate the desired stepless abutment.

Further, it can be arranged for all variable modes to have similar overall ratio spreads, in which case, the variator loadings in each mode will be similar, as long as their input speeds are similar.

In another embodiment, the transmission includes a fixed ratio drive which is substantially equal to the ratio extremities of adjacent variable modes and which is operable while the variable modes are being "primed".

Again, full power drive may also be switchable from one variator at its final ratio to another variator at its start ratio, at the same overall transmission ratio, whilst the latter may be steplessly extendable by incorporating a range change gearset, thereby permitting repetition of the variable modes at different speeds.

As indicated above, take-up-from-rest can be effected by incorporating into the transmission either a fluid clutch, similar, known take-up means and/or a flywheel-sited mechanical clutch. Alternatively, take-up-from-rest may be effected by engagement of the transmission clutches.

In another embodiment of the fourth aspect of the inventive transmission defined above, and as in the case of the three previously-defined inventive transmissions, means may be arranged to provide an increment between the variable and fixed ratio modes or between adjacent variable modes, although it is also possible for adjacent variable modes, or for variable and fixed ratio modes, to overlap each other.

Moreover, the final (output) fixed gear ratio can be arranged to unload the variator(s) and any hydraulic power source (input) can be disconnectable in the final ratio mode.

Before describing in detail the various embodiments of variable ratio power transmission in accordance with the invention and shown in the accompanying drawings, it is considered that a more general introduction to the invention, by way of background information, would be appropriate.

Accordingly, throughout the remainder of this specification, the term "semi-CVT" is used generally to refer to the inventive variable ratio power transmissions, in that, during changes from one stage to another, the ratio is constant and, hence, the transmissions are not strictly continuously variable. They are, however, steplessly variable, an important feature which facilitates full power changes between stages or modes, as well as eliminating "hot shifts".

By using a variator to drive only the sungear of an epicyclic cluster and balancing such input by fixed ratio gearing to an associated carrier or ring gear, the variator will only be required to bear a fraction of the total input torque and power to the cluster.

The penalty for this is that the output ratio spread of a particular stage will be less than the ratio spread of the variator, for example, 2:1 with a 5:1 variator.

To extend the output ratio spread steplessly, the transmission then employs one of three further principles, namely:

(i) The REWIND principle wherein a fixed ratio drive corresponding to the resultant overall ratio at one ratio extremity of the variable mode is engaged, thereby allowing the variator to rewind and the associated epicyclic cluster and gearing to change, so that upon re-engagement of the variator, it will produce the same ratio as that of the end of the previous variable stage and, thence, progress further, having first released the associated fixed ratio drive;

(ii) The ALTERNATE principle wherein a fixed ratio drive corresponding to the resultant overall ratio at one extremity of the variable mode is engaged, thereby allowing the variator input to switch to the hitherto output element, thus obviating rewinding of the variator, commensurate with appropriate changes of epicyclic cluster and associated gearing, to produce the the same output ratio as the ratio at the extremity of the previous variable mode and, thence, progress further having first released the associated fixed ratio drive: and (iii) The TWIN VARIATOR principle wherein a second variator with its input at the other extremity of the first variator and connected to a second epicyclic gearset, plus a balancing geared input, is engaged, such that the output ratios of both drives are matched, following which the first variator may be disconnected and rewound in preparation for a further (third) progressive stage by adjusting the balancing gearing speed and, possibly, the epicyclic cluster ratio also, switching from the second to the third variable stage in a manner similar to the switching from the first to second variable stage described above. Alternatively, the ratio spread can be extended by incorporating a downstream range change gearset, whereby the first and second variable modes can be repeated via the high range, that is, the shallower extremity of the second variable mode in low range corresponds to the deepest extremity of the first variable mode in high range, at the switching point.

It is to be appreciated that a reversal of these sequences returns the overall transmission to its original starting ratio.

BRIEF DESCRIPTION OF THE DRAWINGS

In order that the invention may be more fully understood, various embodiments in accordance therewith will now be described by way of example and with reference to the accompanying drawings in which:

FIGS. 2a-2c are sections of another variable ratio power transmission also employing the twin variator principle but having two Hayes/Perbury-type variators, with four variable stages and direct and reverse drives, as well as an optional, extra low variable stage;

FIGS. 3a-3b are sections of a third embodiment of variable ratio power transmission employing the rewind principle and having a sheave-type variator, with two variable and two fixed modes, plus reverse;

FIGS. 4a-4b are sections of a fourth embodiment of variable ratio power transmission also employing the rewind principle and again having a sheave-type variator, but with three variable and three fixed modes, plus reverse;

FIGS. 6a-6b are sections of a variable ratio power transmission as a sixth embodiment of the invention, which also employs the alternate principle and which has a single Hayes/Perbury-type variator, with four variable modes and direct and reverse gears;

FIGS. 9, 10a-10c and 11 are respective graphic representations of ratio abutments and typical reductions in variator load and power;

FIG. 12 is a graphic representation of a sequence of elements for producing a variable five mode transmission, such as that shown in FIG. 2.

FIGS. 13a-13b and 14a-14b show respective, simplified arrangements for a sheave-type, 2-variable mode unit and another using a Hayes/Perbury-type variator.

DESCRIPTION OF THE PREFERRED EMBODIMENTS

Figure 1B:
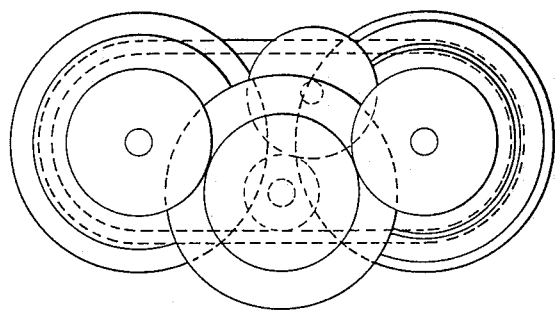
FIGS. 1a and 1b are sections of a variable ratio power transmission employing the twin variator principle and having two sheave-type variators, with four variable stages and direct and reverse drives.

In the drawings, FIGS. 1 to 7 illustrate fixed ratio or direct drives, once the respective transmission has progressed to its shallowest ratio. Thus, in a cruising condition, the variator is not only unloaded but also the transmission provides a fixed ratio preferred by drivers when cruising. For stop/start-type vehicles, such as, town buses, the final fixed ratio would be superfluous. Also, each of the clutches has alpha-numeric references to indicate which ones need to be activated when the transmission is in a particular mode, for example:

$F1$ = 1st Fixed Ratio
$F2$ = 2nd Fixed Ratio
$V1$ = 1st Variable Ratio Stage
$V2$ = 2nd Variable Ratio Stage
$Vn$ = nth Varible Ratio Stage
$D$ = Direct Drive (1:1)
$R$ = Reverse In the drawings also, most clutches are shown as hydraulically-actuable, multi-plate, wet clutches but, since there are no clutches which require to be synchronised under power, they could be mechanically-actuable or, in certain circumstances, synchromesh or dog clutches. However, the take-up is shown, in most cases, as being effected by a fluid clutch, although it is conceivable that, due to the deep ratios which are attainable with semi-CVTs, the take-up may be effected by the modulated application of V1 or F1 clutches, on the basis that the energy for take-up synchronisation of clutches is inversely proportional to the square of the transmission ratio.

Figure 7B:
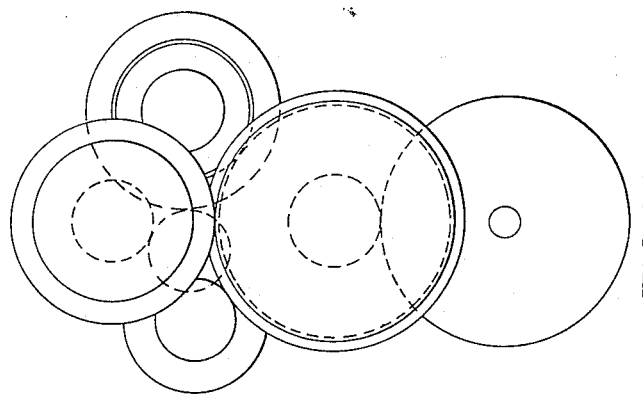
FIGS. 7a-7b are sections of a seventh embodiment of variable ratio power transmission employing the rewind principle and having one Hayes/Perbury-type variator, with three fixed and two variable modes and a manual clutch.
Figure 7A:
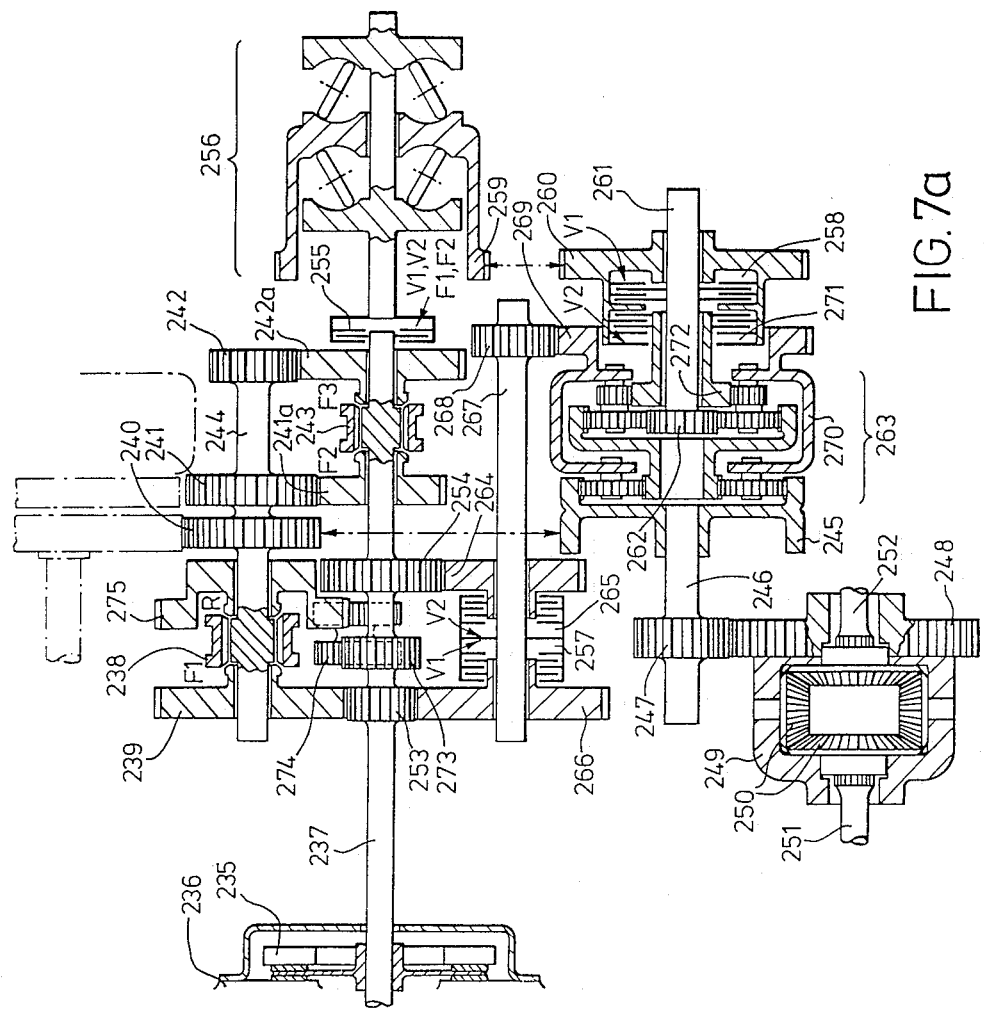

A so-called 'economy' version of semi-CVT, namely, the embodiment of FIG. 7, has a normal clutch take-up and manual synchromesh clutches, although the synchromesh cones are not shown. This type of clutch is feasible, if the take-up (flywheel) clutch is disengaged during inter-mode shifts. This arrangement will also allow increments (steps) between modes, thereby extending the overall ratio spread.

Figure 8A:
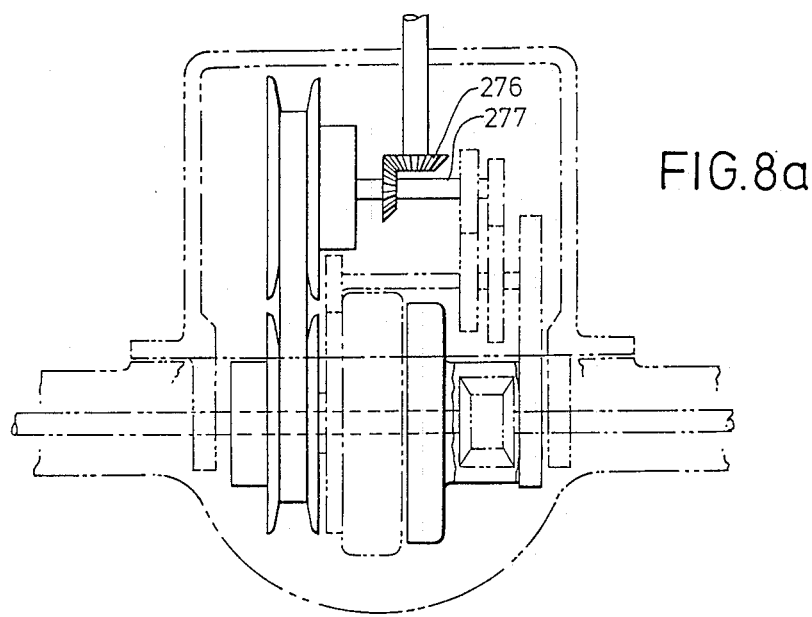
FIGS. 8A and 8B are respective sections of two forms of rear axle for use with any of the seven embodiments of transmission shown in FIGS. 1 to 7.
Figure 8B:
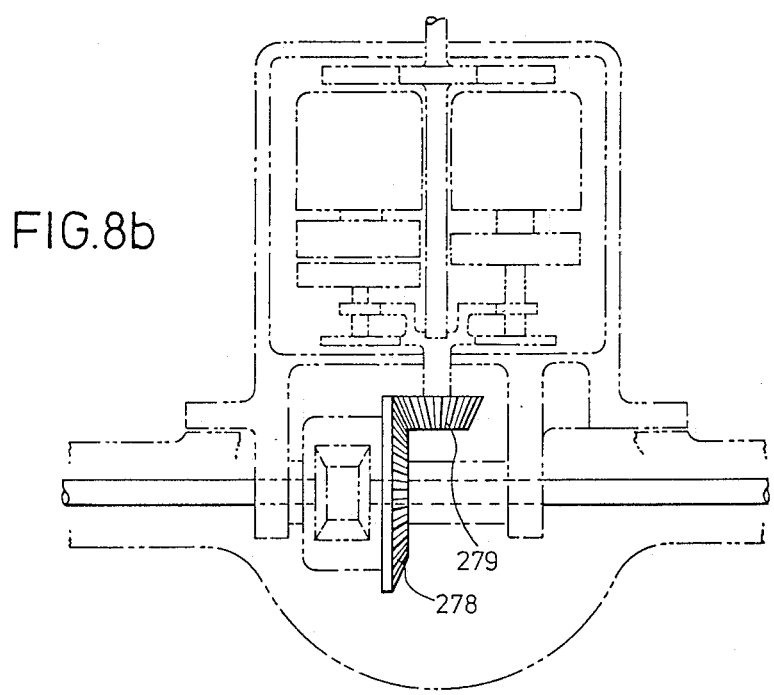

Although in FIG. 7 two variable modes are shown, it is possible that the inter-mode, stepped shifts might require only a single variable mode, for example:

$F1 \div V1_{max} = 1.6$
$V1_{max} \div V1_{min} = 2.2$ } The product of which is equal to a 4.576 spread
$V1_{min} \div F2 = 1.3$ Turning briefly now to FIGS. 8A and 8B, here there are shown two forms of stepless unit incorporated into driving heads which, in turn, are mounted into a bare rear axle housing. This is possible, in that the stepless feature means that the substantial upstream drive train inertia requires no synchronisation during mode changes, although double reduction axles, that is, epicyclic reduction at one end of an associated halfshaft, may be necessary for adequate depth of ratio.

The advantage of such an arrangement is that the drive train is subjected to only engine torque and, hence, there is reduced torque reaction on the engine mounts and virtually no 'power-lifting' of the RH rear wheel during hard acceleration.

The specific embodiments of semi-CVT in accordance with the invention and as shown in the accompanying drawings will now be described in detail.

FIG. 1 - TWIN VARIATOR PRINCIPLE

Semi-CVT with two sheave-type variators, four variable stages, direct drive and reverse, exhibiting a sequence of V1, V2, V3, V4 and D and a typical, stepless ratio spread of 20:1.

Figure 1A:
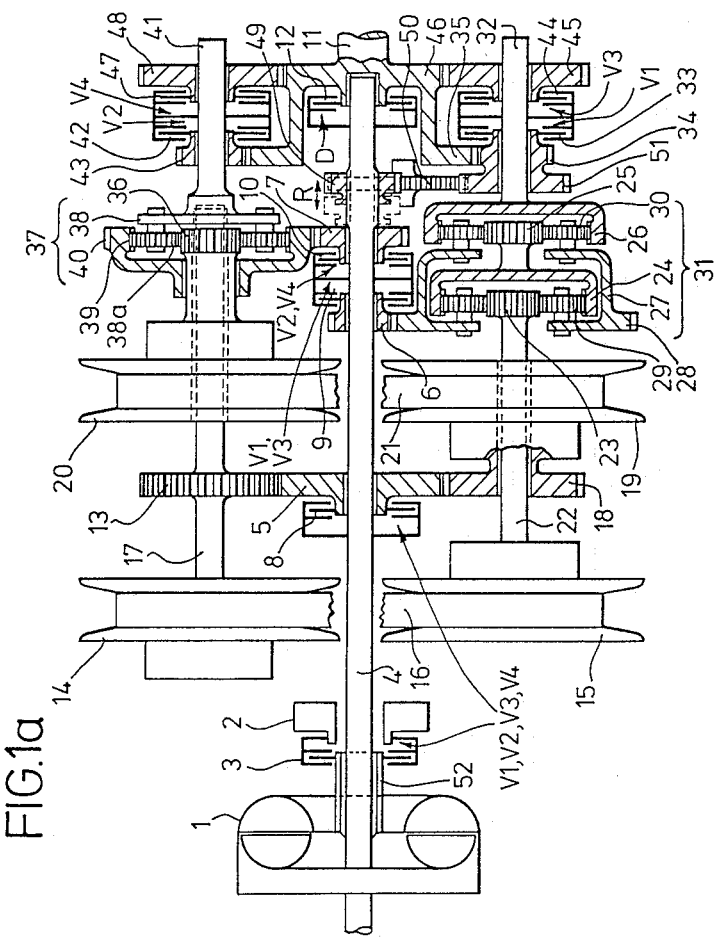

A first embodiment of semi-CVT is shown in FIG. 1, wherein a prime mover, namely, an engine (not shown), is arranged to drive a fluid clutch 1 and an hydraulic pump 2 via a pump clutch 3. The output from the fluid clutch 1 is connected to a mainshaft 4 which is capable of driving selectively mainshaft gears 5,6,7 by the engagement of respective clutches 8,9,10 and can be coupled directly to an output shaft 11 by the engagement of another clutch 12.

The mainshaft gear 5 meshes with a first variator drive gear 13 which, via a shaft 17, is connected directly to a first variator input pulley 14 connected, in turn, to a first variator output pulley 15 by means of an endless belt 16. The mainshaft gear 5 meshes with a second variator drive gear 18 which is connected to a second variator input pulley 19 for driving a second variator output pulley 20 via another endless belt 21.

The variator clutch 8 is always engaged during the variable modes and, in V1, a proportion of the drive from the mainshaft 4 is transmitted, via the clutch 8 and gears 5,13, to the first variator input pulley 14 and thence, via the belt 16 and first variator output pulley 15, to a shaft 22 which is connected to a sungear 23 of a compound epicyclic gearset 31 comprising a first sungear 23, a ring gear 24, first planets 29, a second sungear 25, a second ring gear 26, second planets 30 and a carrier 27. The mainshaft 4 is arranged to transmit the remaining drive, via the clutch 9 which is engaged, to the mainshaft gear 6 meshing with a gear 28 fixed to the carrier 27.

Thus, the V1 drive is divided into two balanced paths which re-unite at the compound epicyclic gearset 31, to produce an output at the second ring gear 26 rigidly fixed to a shaft 32 which, via an engaged clutch 33 and gear 34, transfers the output to the output shaft 11 via a larger diameter output gear 35.

As the relative pitch diameters of the input and output pulleys 14,15 vary, for example, increasing the speed of pulley 15 relative to pulley 14, then, with appropriate ratios of the epicyclic cluster 31 and gears 6,28, the speed of the output shaft 11 will increase relative to the input shaft 4 but not in the same relationship as the pulleys. Typically, if the ratio spread of the variator is 5:1, then the ratio spread in the V1 mode may be arranged to be 2.0 or so, by use of an appropriate gearing.

Similarly, in the V2 mode, part of the engine drive power in the mainshaft 4 is transmitted via the clutch 8 and gears 5,18 to the second variator input pulley 19 and, via the belt 21 and second variator output pulley 20, to the sun gear 36 of a simple epicyclic gearset 37 comprising a sun gear 36, ring gear 39, carrier 38 and planets 38a.

The remaining drive in the mainshaft 4 is transmitted via the clutch 10 which is engaged, the gear 7 and a further gear 40 fixed to the ring gear 39.

Thus, the V2 drive is also divided into two balanced paths which re-unite at the simple epicyclic gearset 37, to produce an output at the carrier 38 and connected shaft 41 which, via an engaged clutch 42 and gear 43, transfers output to the output shaft 11, via the larger diameter output gear 35.

As the second variator output pulley 20 speeds up relative to the associated input pulley 19, this arrangement can also increase the speed of the output shaft 11 by a ratio similar to that in the V1 operational mode, for example, 2.0:1. Additionally, the starting (deepest) ratio of the V2 mode can be made identical, or substantially so, to the final (shallowest) ratio of the V1 mode, such that a small timing overlap in the application of the clutches 9,33 and 10,42 facilitates full power drive, while switching from one mode to the other.

The V3 mode is identical to the V1 mode, except that the output shaft 32 is connected to an engaged clutch 44 and a gear 45 which meshes with a smaller diameter ouput gear 46, instead of the clutch 33 and gears 34,35 in the V1 mode described above.

This difference in output gearing, namely, 34,35 as opposed to 45,46, which is effectively a range change, enables the starting (deepest) ratio of V3 to be the same, or substantially so, as the final (shallowest) ratio of V2, again permitting a small timing overlap in the engagement of respective clutches 10,42 with clutches 9,44 to facilitate full input power during the V2/V3 mode change.

Again, the V4 mode is very similar to the V2 mode, except that the output shaft 41 is connected to an engaged clutch 47 and gear 48 meshing with the smaller diameter output gear 46, instead of the clutch 42 and meshing gears 43,35.

The difference in output gearing enables the starting (deepest) ratio of the V4 mode to be the same, or substantially so, as the final (shallowest) ratio of the V3 mode, thus permitting a small timing overlap in the engagement of respective clutches 9,44 with clutches 10,42, to facilitate once again full power input during the associated mode change.

The final (shallowest) ratio of V4 is such that the output shaft 11 rotates at substantially the same speed as the mainshaft 4, so that the mainshaft 4 can be clutched directly to the output shaft 11, by the engagement of the clutch 12 just prior to the release of clutches 8,10,47, thereby permitting full input power during the V4 to D mode shift.

The resultant direct drive is compatible with conventional rear axles.

It is also to be noted that the torque input to the variators can be further modified by adjusting their input speeds via gears 5,13 and 5,18, with corresponding adjustments to the other gear and/or epicyclic ratios, to provide the desired overall transmission ratio.

If the direct drive clutch 12, driven by a shaft 4 connected to the fluid clutch turbine, is a mechanically-actuable, friction clutch, as opposed to an hydraulically-actuable one, then it is possible to disengage another mechanically-actuable, friction clutch 3, to eliminate pump load losses in the direct mode, as the variators are isolated. It would, of course, be re-engaged to prime any associated hydraulic circuit prior to any downshift from the D mode.

It is also to be noted that clutches 9,10 are not wholly necessary but have been included in this embodiment to isolate completely the variators in the direct mode, D.

Reverse is effected by a sliding gear 49 splined to the mainshaft 4 into meshing relationship with an idler gear 50 which is already meshing with a gear 51 rigidly fixed to the gear 34, thereby transmitting reverse torque to the larger output gear 35 and the output shaft 11.

However, since there will be some output (drag) from the fluid coupling, it will be necessary to either arrest the mainshaft 4 by low pressure application of the clutch 12 during reverse gear engagement or introduce a reverse gear, wet clutch into the geartrain 51,50,49.

The resultant ratio range of this particular embodiment of semi-CVT is the square of the product of the ratio spreads of the basic variable modes, namely:

$$(V_1 \times V_2)^2 \text{ or } V_1 \times V_2 \times V_3 \times V_4$$

where $V_1$, $V_2$, $V_3$ and $V_4$ are the ratio spreads of respective modes V1, V2, V3 and V4.

FIG. 2 - TWIN VARIATOR PRINCIPLE

Semi-CVT with two Hayes/Perbury-type variators, four variable stages, direct drive and reverse, exhibiting a sequence of V1, V2, V3, V4 and D and a typical, stepless ratio spread of 20:1.

The basic principles of construction and operation of the second embodiment of semi-CVT shown in FIG. 2, are very similar to those of the first embodiment described above with reference to FIG. 1, except that in this second embodiment, each of two Hayes/Perbury-type variators has a coaxial input and output, with the rotation of each output being opposite to that of the associated input. Consequently, this arrangement requires a completely different layout to that of the sheave-type variators of the first embodiment, in that, basically, it requires four main axes as opposed to three.

In FIG. 2, the fluid clutch 1, driven by an engine (again not shown) as a prime mover, drives an input shaft 53, on an upper axis, which is rigidly connected to a gear 54 meshing with another gear 55 fixed to a countershaft 56 on the lower axis. When a clutch 57 is engaged, the input shaft 53 is coupled to a gear 58 which meshes with gears 59,60, to drive respective Hayes/Perbury-type variators 61,62 via associated shafts 63,64, in a direction counter to that of the input shaft 53. However, the outputs from the variators 61,62 are opposite in direction to shafts 63,64 and are connected to the input sun 23 of a compound epicyclic gearset 31, as also shown in FIG. 1, and the input sun 36 of a simple epicyclic gearset 37, again as also shown in FIG. 1, respectively. The downstream range change arrangement is also described above with reference to the first embodiment of FIG. 1, and the countershaft 56 carries clutches 9,10 and gears 6,7, as does the mainshaft 4 of FIG. 1.

Thus, in the V1 mode, the drive from the input shaft 53 is divided between, on the one hand, the sun gear 23 via engaged clutch 57, gears 58,59, shaft 63 and variator 61 and, on the other hand, the carrier 27 via gears 54,55, the shaft 56, engaged clutch 9 and meshing gears 6,28, to produce a combined output at the ring gear 26 and a final output at an output shaft 66, via the shaft 32, engaged clutch 33 and meshing gears 34,35, with the final output 66 being counter in direction to the input shaft 53.

In the V2 mode, drive from the input shaft 53 is divided between, on the one hand, the sun gear 36 via the clutch 57, gears 58,60, shaft 64 and variator 62 and, on the other hand, the ring gear 39 via gears 54,55, the shaft 56, engaged clutch 10 and meshing gears 7,40, to provide a combined output at the carrier 38 and a final output at the output shaft 66 via the shaft 41, engaged clutch 42 and meshing gears 43,35.

For a stepless transition from V1 to V2, the final (shallowest) ratio of V1 is the same as the starting (deepest) ratio of V2.

As described above in relation to the first embodiment of semi-CVT, the upper two ratios V3 and V4 are operable by transmitting their respective output torques to the output shaft 66 via the clutch 44 and gears 45,46 and via the clutch 47 and gears 48,46, respectively, instead of via engaged clutch and meshing gears 33,34,35 and 42,43,35, respectively.

At the final ratio of V4, a fixed ratio drive F is effected by engaging a clutch 68 and disengaging all other clutches. This is, however, in counter rotation to the input shaft 53 and the partial section shows an arrangement for converting all modes to like rotation output by meshing a gear 69, which is rigidly fixed to the countershaft range change gears 35,46, with a gear 67 which is rigidly fixed to an output shaft 11 located on the same axis as that of the input shaft 53. This arrangement facilitates a direct coupling final drive D by engaging the clutch 12 and releasing all other clutches.

As in FIG. 1, the clutches 9,10 are not essential for operation of the transmission, although they do facilitate isolation of the variator in the D mode.

Reverse is obtainable by sliding a gear 70, splined on to the mainshaft 53, into meshing relationship with another gear 71, which reverses rotation of the gear 43, thereby reversing rotation of the output.

However, to overcome mainshaft rotation due to fluid coupling drag, the clutch 68 or 12 could be temporarily engaged, by low pressure, when sliding reverse gears into mesh.

An enhanced arrangement for providing like rotation output is to apply the output from the fluid clutch 1 to the shaft 56, instead of to the shaft 53, thereby eliminating the partial section gears 67,69, and utilise the reverse geartrain described above with reference to the first embodiment of FIG. 1.

The ratio spread can be further extended by introducing an epicyclic reduction gearset 37a into the output shaft 41 of the simple epicyclic gearset 37. This provides an extra low (EL) variable mode by reducing the V2 speed range by an appropriate amount, such that the shallowest ratio of the EL mode abuts the start ratio of the V1 mode. Thus, the EL mode operates as does the V2 mode, except that, in addition, the clutch 37c is freed and the brake band 37b of the gearset 37a is engaged to ground the ring gear 37d, thereby producing this speed reduction at the shaft 41.

For V2 and V4 modes, the brake band 37b is disengaged and the clutch 37c is engaged.

FIG. 3 - REWIND PRINCIPLE

Semi-CVT with sheave-type variator, two variable modes, two fixed modes and reverse, exhibiting a sequence of V1, F1, V2 and F2 and a typical stepless ratio spread of 4.0.

The first and second embodiments of semi-CVT described above with reference to FIGS. 1 and 2 are capable of producing substantially continuous variation of ratio throughout the ratio spread, which typically might be 20:1 or more, such as may be necessary for heavy trucks or on/off-road vehicles.

For smaller vehicles, the required ratio spread is usually less than that for larger vehicles and, also, the cost of two variators may well prove to be commercially undesirable.

Accordingly, FIG. 3 shows a third embodiment of semi-CVT which meets such a requirement.

In this third embodiment, the output from the fluid clutch 1 drives a mainshaft 72 which incorporates fixed gears 73–77 and, via an engaged clutch 78, a variator input pulley 79 which is connected to a variator output pulley 80 via an endless belt 81.

In the V1 mode, the proportion of the drive from the output pulley 80 drives a first sungear 82 of a compound epicyclic gearset 83 comprising, in addition to the sungear 82, a first ring gear 84, first planets 85, a second sungear 86, a second ring gear 87, second planets 88 and a carrier 89. The input shaft 72 also transmits the remaining drive via a first mainshaft gear 73, a gear 90, an engaged clutch 91, a layshaft 92 and a layshaft fixed gear 93 meshing with a further gear 94 fixed to the carrier 89.

The drive paths re-unite at the compound epicyclic gearset 83, to produce an output at the second ring gear 87 rigidly fixed to a differential carrier 95 and, thence, to output shafts 96,97 via differential side gears 98 and pinions 99.

As the variator output pulley 80 increases in speed relative to the input pulley 79, the mean speed of output shafts 96,97 will increase relative to the input mainshaft 72, although not in the same relationship. Typically, if the variator ratio spread is 5:1, then the ratio spread in the V1 mode would be 2.4:1 or so.

To allow the variator to rewind at this ratio prior to operating a faster, V2 mode range, drive is taken-up by a fixed ratio F1, so-effected by engaging a clutch 102 on a second layshaft 103, thereby transmitting input power from the mainshaft 72, via gears 75,101 and the layshaft 103, to the second layshaft output gear 100 which meshes with a final drive gear 104 mounted on the differential carrier 95. In this manner, a fixed ratio F1 equal, or substantially so, to the final (shallowest) ratio of the V1 mode is produced.

This arrangement allows the first layshaft clutch 91 to disengage, to permit the variator to rewind.

When such rewind is complete in, say, about 2 seconds, the V2 mode is engaged by applying a first layshaft clutch 105 to drive the epicyclic carrier 89 at a faster speed via gears 76,106, the shaft 92 and meshing gears 93,94, such that the start (deepest) ratio of the V2 mode is substantially equal to the final (shallowest) ratio of the V1 mode, thereby facilitating a stepless transition of V1—F1—V2.

As the variator ratio changes from its starting to final ratio, again the ratio of the final drive gear 104, that is, at the output, to the input 72 also varies but with a typical ratio spread of, say, 1.67. The V1 and V2 ratio spreads can be adjusted between values dictated by practicable gearing.

At the final ratio of the V2 mode, a second fixed ratio F2 is adopted by engaging a clutch 108, such that F2 drive is from the mainshaft 72, via gears 77,107, the clutch 108, the shaft 103 and gears 100,104. The F2 ratio is again very similar to the V2 final ratio.

When the F2 mode is engaged, all other clutches, including the variator drive clutch 78, can be disengaged, such that spin losses seek their minimum value.

The resulting ratio spread is then typically:

$$2.40 \times 1.67 = 4.00$$

To obtain reverse, a clutch 109 on the second layshaft 103 is engaged, to drive from the mainshaft 72, via the gear 74, a reverse gear shaft 110, a layshaft reverse gear 111 and the final gears 100, 104.

FIG. 4 - REWIND PRINCIPLE

Semi-CVT with sheave-type variator, three variable modes, three fixed modes and reverse, exhibiting a sequence of V1, F1, V2, F2, V3 and F3 and a typical stepless ratio spread of 8.76

A fourth embodiment of semi-CVT shown in FIG. 4 has a principle of operation which is similar to that of the third embodiment described above, notable differences being the addition of a simple epicyclic gearset 112 and two options for the first sungear input to a compound epicyclic 113. Also, an optional input path is shown, this being achieved by re-siting the fluid clutch 1 to the right hand side of the Figure.

The V1 and F1 modes operate in basically the same manner as the same modes of the third embodiment of FIG. 3 and, consequently, the relative components have been given like reference numerals, although a slight disparity is that the clutch 114, interposed in the variator output, will be engaged and the output of the second ring gear 87 will be direct to the output gear 104.

Thus, and while rewinding the variator, the V2 mode redirects the variator output to a sungear 117 of the simple epicyclic gearset 112, via gears 118, 119, by disengaging the clutch 114 and engaging clutch 115. The input shaft 72 transmits the remaining power via an engaged clutch 120 and a mainshaft gear 121 to a further gear 122 which is fixed to a ring gear 123 of the simple epicyclic 112.

The re-united drive produces an output at an associated carrier 124, which is then transmitted to the output gear 104 via a shaft 125 and gear 126.

The starting ratio of the V2 mode will be substantially the same as that of the F1 mode and the final ratio of the V2 mode will be substantially the same as the fixed ratio mode F2.

The F2 mode is effected by engaging a layshaft clutch 127, thereby driving the output gear 104 via gears 77, 107, 100.

The V3 mode is achieved by rewinding the variator in the F2 mode, having firstly disengaged the variator output clutch 115 and mainshaft clutch 120, and then engaging the variator output clutch 116 and the layshaft clutch 128, prior to disengaging the clutch 127 for the F2 mode.

This results in a larger sungear 129 driving a first planet smaller step 130 and the mainshaft 72 driving the carrier 89 via gears 131, 132, the shaft 92 and gears 93, 94, thereby producing a V3 starting ratio substantially equal to the F2 ratio and a final V3 ratio substantially equal to the F3 ratio, with the output at the gear 104 via the ring gear 87.

The F3 mode is effected by engaging a clutch 133, thereby transmitting drive from the mainshaft 72 to the output gear 104 via gears 134, 135, 100.

The resultant ratio spread is then typically:

$$2.25 \times 2.25 \times 1.73 = 8.76$$

Reverse gear with this double sungear/stepped planet type of epicyclic cluster is achieved by grounding the larger sungear 129 by engaging the clutch 116 and a brake band 136 and engaging the layshaft clutch 128, provided that pitch circle diameters conform to the equation:

$$1 < \frac{\text{larger sungear (129)}}{\text{first ring gear (84)}} \times \frac{\text{larger planet (85)}}{\text{smaller planet (130)}}$$

FIG. 5 - ALTERNATE PRINCIPLE

Semi-CVT with sheave-type variator, three variable modes, three fixed modes and reverse, exhibiting a sequence of V1, F1, V2, F2, V3 and F3 and a typical stepless ratio spread of 8.76

Figure 5B:
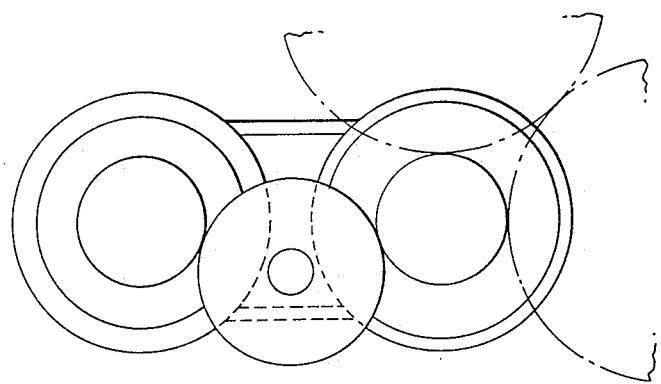
FIGS. 5a-5b are sections of a fifth embodiment of variable ratio power transmission which is similar to that shown in FIG. 4, except that is employs the alternate principle.
Figure 5A:
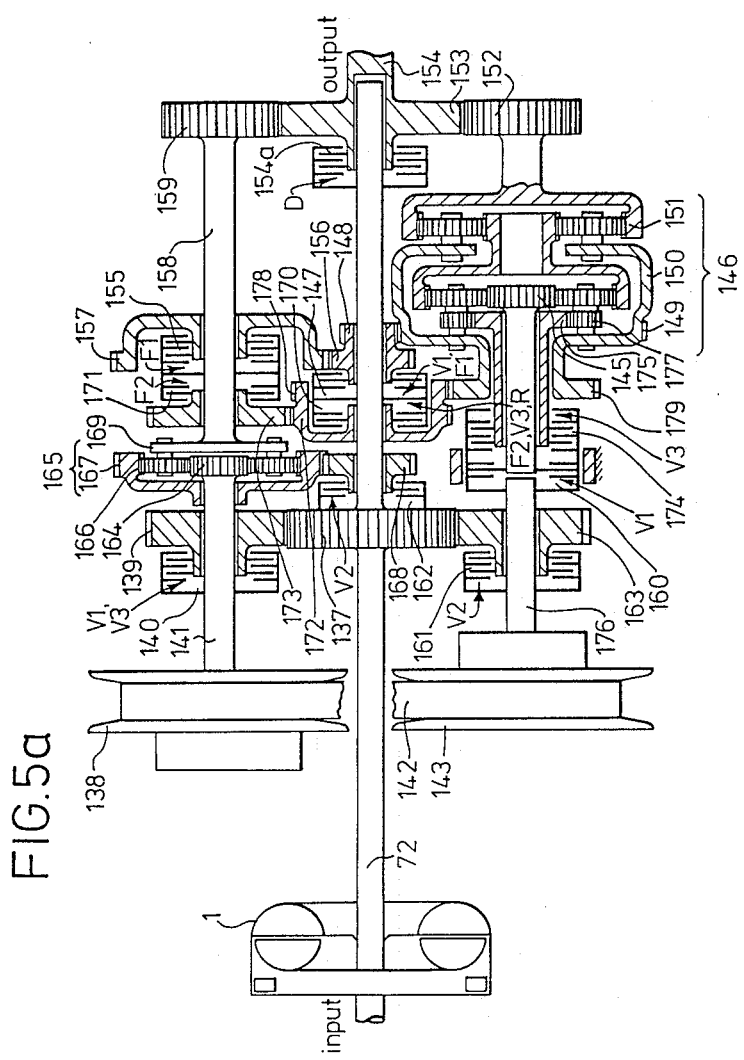

A fifth embodiment shown in FIG. 5 is similar to the FIG. 4 embodiment, except that the variator does not require rewinding between adjacent variable modes and that the variator input switches from one pulley to the other. However, the variator will normally need to be synchronised with its respective input drives between adjacent variable modes and, as a consequence, the intermediate fixed modes F1 and F2 are still required.

Also the arrangement shown in FIG. 5 has three shafts, which is more compact than the four shaft arrangement of FIG. 4.

Take-up-from-rest is in the V1 mode via the fluid clutch 1 which drives a transmission input shaft 72 and a variator gear 137.

The V1 mode divides the input, in the usual manner, to:

(a) drive the variator whose output drives a sungear; and (b) drive another element of the epicyclic, to balance the torque on the sungear.

Thus, from gear 137, the (a) portion of the drive to the variator pulley 138, that is to say, the input pulley in the V1 mode, is via gear 139, an engaged clutch 140 and a shaft 141. A drive belt 142 transfers this drive portion to the variator pulley 143, that is to say, the variator output pulley in the V1 mode, and then via a shaft 176 and another engaged clutch 160 to a smaller sungear 145 of a compound epicyclic gearset 146.

The (b) portion of the drive is effected via an engaged clutch 147 and meshing gears 148, 149, to drive a carrier 150 of the gearset 146.

The re-united drive paths produce an output at a second ring gear 151 and, via gears 152, 153, to a transmission output shaft 154.

As the variator input/output velocity changes from the starting ratio of, say, 2.24, to the final ratio of, say, 0.45, for a 5:1 spread variator, the transmission ratio change is designed to be, say, 2.25:1, to reduce the percentage of full torque and power passing through the variator, which are considered to be the limiting operating factors.

When the final ratio of the V1 mode is reached, a clutch 155 is engaged, such that a fixed ratio drive F1, with substantially the same ratio as the final V1 ratio, is achieved at an output shaft 154, via the still-engaged clutch 147, gears 156, 157, clutch 155, shaft 158 and gears 159, 153.

To achieve the V2 mode, the variator clutch 140 and a clutch 160 are then disengaged and clutches 161 and 162 are engaged to synchronise the pulley 143 with its associated drive gear 163. This then becomes the input pulley driving the now output pulley 138, via the drive belt 142. In turn, this drives the shaft 141 and the sungear 164 of a simple epicyclic gearset 165. In addition, the engagement of the clutch 162 directs a fixed ratio drive to the ring gear 166 of the gearset 165, via meshing gears 168, 167, to produce a re-united output at the carrier 169 which is fixed to the shaft 158 already being driven in the F1 mode. At this time, clutches 155, 147 are disengaged, to allow the V2 mode to progress from its start ratio to its final ratio.

At this moment, the fixed ratio F2 is adopted by engaging clutches 170, 171 to drive the shaft 158 via gears 172, 173 and then the output shaft 154 via gears 159, 153, at substantially the same overall transmission ratio as V2 at its shallowest ratio extremity.

The V2 clutches 161, 162 are then disengaged and, for the V3 mode, the clutches 140, 174 are engaged, to synchronise the variator pulley 138 with its drive gear 139, such that it again becomes the effective input pulley driving an output pulley 143 via a drive belt 142. The output pulley 143 then drives a larger sungear 175 through a shaft 176 and the engaged clutch 174. The larger sungear 175 meshes with the smaller gears 177 of the stepped planets, to provide less ratio reduction in the gearset 146 which, with the carrier 150 being driven faster than in the V1 mode, by virtue of meshing gears 178, 179, can produce a V3 range with a start ratio as F2 and after disengaging F2 clutch 171, progress to a final ratio of unity, such that the output shaft 154 can be clutched steplessly and directly to the input shaft 72 via clutch 154a, thereby allowing all other clutches to be disengaged to minimise spin losses.

These operating sequences are reversed as the speed of the output shaft falls or by power demand. A typical ratio spread would be the same as that for the fourth embodiment, namely:

$$V1 \times V2 \times V3 = 2.25 \times 2.25 \times 1.73 = 8.76$$

Reverse gear is achieved in a similar manner to that described above in relation to the fourth embodiment.

FIG. 6 - ALTERNATE PRINCIPLE

Semi-CVT with Perbury variator, four variable modes, four fixed modes and reverse, exhibiting a sequence of V1, F1, V2, F2, V3, F3, V4 and D and a typical stepless ratio spread of 20:1

Although with multi-stage units take-up-from-rest on level ground can be in the next to lowest range, in this case, V2, take-up-from-rest will be assumed to occur in the V1 mode, so that the full range of this sixth embodiment can be seen.

Thus, and referring to FIG. 6, after take-up by the fluid clutch 1, drive passes to an input shaft 180 which, in the V1 mode, divides the drive into two paths, namely:

(a) by applying clutch 181 to the variator input members 183 and then via rotors 184 to provide a reversed output at member 185 which, via meshing gears 186, 187, drives a first sungear 188 of a compound epicyclic gearset 189; and (b) to a carrier 190 of the gearset 189 via meshing gears 191, 192, an engaged clutch 193, a shaft 194 and a gear 195 meshing with another gear 196 which is fixed to the carrier 190.

This arrangement results in an united output at a second ring gear 197 and then, via a shaft 198, an engaged clutch 200, a gear 199, idler gears 201, 202 and a low range output gear 203, to an output shaft 204.

As the variator progresses from its start ratio to its final ratio, so the output shaft 204 will increase in speed by a factor of, say, 40% of the ratio spread of the variator. At this point, the fixed ratio F1 is adopted by engaging clutches 205, 206, to transfer drive through gears 207, 208 to a shaft 209 and gears 202, 203 to the output shaft 204. The F1 and final V1 ratios are substantially identical and, consequently, there is minimal slip between the clutches 205, 206 and 193, 200, 181 before the latter clutch group is disengaged and the central member 185 of the variator and meshing gears 213, 214, 215 are "synchronised" with the input shaft 180, by application of clutches 182, 210, 211 to effect the V2 ratio, followed by release of F1 clutches 205, 206.

The term "synchronised" is used here for all the interconnecting components 185, 213, 214 and 215, even though it strictly only applies to the velocity of gear 215, since rotation is reversed and gear speeds may differ.

This splits the V2 drive from the input shaft 180 between:

(i) the variator centre member 185 which now becomes the input member and which provides an output at a gear 216 meshing with another gear 217, to drive a sungear 218 of a simple epicylic 219; and (ii) the ring gear 220 of gearset 219 via engaged clutch 210 and meshing gears 221, 222.

The divided drives unite at a carrier 223 and are transferred to the output shaft 204 via engaged clutch 211 and meshing gears 212, 203.

As the variator changes from its start to its final ratio, so the speed of the output shaft 204 increases relative to the input shaft 180, although by only about 40% of the speed ratio increase of the variator output member 183 relative to the input member 185.

At this point, the fixed ratio F2 is applied by engaging clutches 224, 206, to transmit drive from the input shaft 180 to the output shaft 204 via meshing gears 225, 226, the shaft 209 and the meshing gears 202, 203, following which the V2 clutches 182, 210, 211 are disengaged to allow the variator end members 183 to synchronise with the input shaft 180 by application of clutches 181, 193 and a high range clutch 227, thereby producing the start ratio for the V3 mode, which is very similar to the F2 ratio.

The V3 and F3 mode drives are identical to that of the V1 and F1 modes, except that a range change takes place at the gearing driving the output shaft 204, for example, instead of the V3 united output from shaft 198 passing through the clutch 200 and gears 199, 201, 202, 203, it passes through the clutch 227 and gears 228, 229, 230. Similarly, F3 passes through clutch 206a and gears 229, 230, instead of clutch 206 and gears 202, 203.

The V4 mode will be as for the V2 mode, except that the drive from the shaft 224 to the output shaft 204 will be via a clutch 231 and meshing gears 232, 230, instead of via clutch 211 and gears 212, 203, so that the V4 start ratio is similar to the F3 ratio. The final ratio of the V4 mode is close to unity to permit a direct coupling of the input shaft 180 with the output shaft 204 via a clutch 233, so that all other clutches may be disengaged to minimise spin losses.

These operating mode sequences will be reversed either as the speed of the output shaft falls or there is a requirement to increase engine speed relative to the output shaft speed.

Reverse is attained by sliding an idler gear 234, which is already in mesh with the gear 226, into mesh with the low range output gear 203 and engaging either the clutch 205 or the clutch 224, to drive the gear 226 via gears 207, 208 and shaft 209 or via the gear 225, respectively.

FIG. 7 - REWIND PRINCIPLE (With drive disengagement during shifts)

Semi-CVT with Hayes/Perbury-type variator, two variable modes, three fixed modes and reverse, exhibiting a sequence of F1, V1, F2, V2 and F3

In a seventh embodiment of semi-CVT, as shown in FIG. 7, instead of a fluid clutch, output from the prime mover, namely, an engine (not shown), is taken up by a conventional, manually-operable clutch 235 attached to a flywheel 236 of the prime mover, which drives an input shaft 237, take-up-from-rest being in the F1 mode, to protect the variator from sharp inputs.

This first, F1 mode is achieved by moving the clutch 238, which may be of the synchromesh type, into the F1 position, to connect drive from the input shaft 237 to a differential carrier 249 via gears 253, 239, 240, 245, a shaft 246 and gears 247, 248. Also, as the shaft 237 rotates, a clutch 255 is engaged to drive the variator 256, hydraulic power being supplied from a pump (also not shown) driven by the prime mover.

Since the manual clutch allows disconnection of prime mover drive, there can be an increment (underlap) between the F1 ratio and the starting ratio of the V1 mode, similar to that in conventional, manual transmissions.

Thus, for the V1 mode whilst the take-up clutch 235 is disengaged, the clutch 238 will revert to its neutral position and clutches 257, 258 will be engaged, to provide two drive paths from the input shaft 237 to the gear 245, as follows:

(a) via the clutch 255, variator 256, variator output gear 259, meshing gear 260, clutch 258 and shaft 261 to the smaller, first sun gear 262 of a compound epicyclic gearset 263; and (b) via gears 253, 266, clutch 257, shaft 267 and gears 268, 269, to drive a carrier 270 of the gearset 263.

This arrangement results in a united output at the gear 245 and, via the shaft 246, gears 247, 248, differential carrier 249 and differential gears 250, to the output shafts 251, 252.

As the variator ratio moves from its start to its final ratio, the output speed at the differential carrier 249 also increases relative to the speed of the input shaft 237, although the ratio spread is, say, only 40% of that of the variator.

At this point, the take-up clutch 235 is disengaged to facilitate a shift into the F2 mode by moving the synchromesh clutch 243 into the F2 position whilst, at the same time, disengaging V2 clutches 257, 258, after which the take-up clutch 235 is re-engaged. Thus, F2 drive is via the mainshaft 237, the clutch 243 in its F2 position, gears 241a, 241 and 240, 245 the shaft 246 and gears 247, 248 to the differential carrier 249. There may be an increment (underlap) between the final ratio of the V1 mode and the fixed ratio F2 mode.

Similarly, there may be an increment between the fixed ratio F2 mode and the start ratio of the V2 mode, which is attained by rewinding the variator while in the F2 mode and then disengaging the take-up clutch 235, moving the synchromesh clutch 243 to the neutral position whilst, at the same time, engaging clutches 265, 271, to divide the V2 drive from the input shaft 237 to the gear 245:

(a) through the clutch 255, variator 256, gears 259, 260 and an engaged clutch 271 to the larger input sun gear 272 of the compound epicyclic gearset 263; and (b) through gears 254, 264, clutch 265, shaft 267 and gears 268, 269 to drive the carrier 270 of the gearset 263.

This results in a united output at the gear 245 and via the shaft 246, gears 247, 248, differential carrier 249 and differential gears 250 to the output shafts 251, 252.

As the variator moves from its start to final ratio, the ratio of the transmission output speed relative to the input speed increases but by, say, only 40% of the ratio spread of the variator.

Similar input/output ratio spreads in the V1 and V2 modes are achieved by changing the overall ratio of the gearset 263 by selecting the appropriate input sungear 262 or 272 and calculating an appropriate drive ratio for the speed of the carrier 270.

To facilitate shift into F3, the take-up clutch 235 is disengaged, whilst the synchronising clutch 243 moves to the F3 position and the V2 mode clutches 265, 271 are disengaged. Thus, F3 drive is as the F2 drive, except that drive is via gears 242a, 242, instead of gears 241a, 241. Again, there may be an increment (underlap) between the final V2 ratio and the F3 ratio.

A typical ratio spread resulting would be:

$$\underset{1.5}{F1 \to V1} \times \underset{2.0}{V1} \times \underset{1.4}{V1 \to F2} \times \underset{1.3}{F2 \to V2}$$

$$\underset{2.0}{V2} \times \underset{1.15}{V2 \to F3} = 12.56$$

It is also feasible that the F2 mode can be deleted if there is an overlap between the V1 and V2 modes, such that the shifts can occur at the same variator ratio, thereby avoiding the delay in rewinding, for example, a mean ratio difference of 1.4 or so. In such a case, the transmission ratio spread would be approximately:

$$\underset{F1 \to V1}{1.5} \times \underset{V1}{2.0} \times \underset{V1_{min} \to V2_{min}}{1.4} \times \underset{V2 \to F3}{1.15} = 4.83$$

While in the F3 mode, all other clutches may be disengaged to reduce spin and pump losses, although some must be re-engaged in anticipation of shifts into variable modes.

Reverse is attained by moving the clutch 238 into reverse position to transmit drive from the input shaft 237 to the output gear 248, via a gear 273, a reverse idler gear 274, a reverse gear 275, meshing gears 240, 245, the shaft 246 and the gear 247, shifts occurring while the clutch 235 is disengaged.

Alternatively, reverse may be obtained as described above in relation to the fourth embodiment shown in FIG. 4 of the drawings.

It will be appreciated that the arrangement shown in FIG. 3 for the third embodiment with the sheave-type variators, can be adapted to a conventional flywheel-type take-up clutch and, consequently, operate in a similar manner to the embodiment of FIG. 7.

In FIG. 8A, there is shown a rear axle siting as described earlier, in this case, the axes of a FIG. 3 type semi-CVT, namely, the third embodiment, are parallel to the axis of the axle and the input is via a bevel pinion 276, to rotate the drive through 90° to an input shaft 277.

FIG. 8B shows a rear axle siting with the semi-CVT axes at right angles to the axis of the axle and depicts a FIG. 2 type of semi-CVT, namely the second embodiment, with a conventional rear axle crown wheel 278 and pinion 279.

A particular feature of this arrangement is that by fully containing the semi-CVT in its own casing, different oil, such as, hypoid oil, can be used for the final drive crown wheel and pinion.

It is to be appreciated that power take-off units can be applied to either the fixed or variable modes in any of the above described embodiments, whilst the associated vehicle is being driven in any mode or is stationary.

Figure 10A:
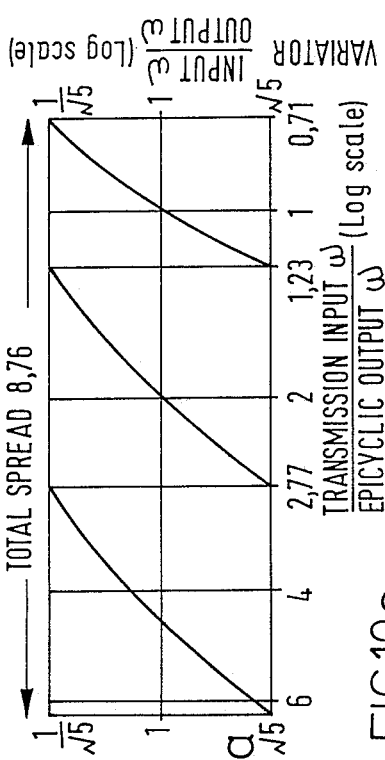
Figure 10C:
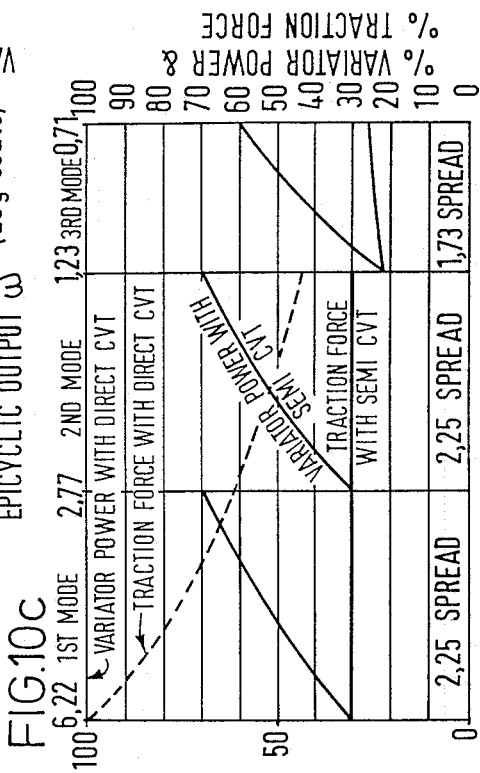
Figure 10B:
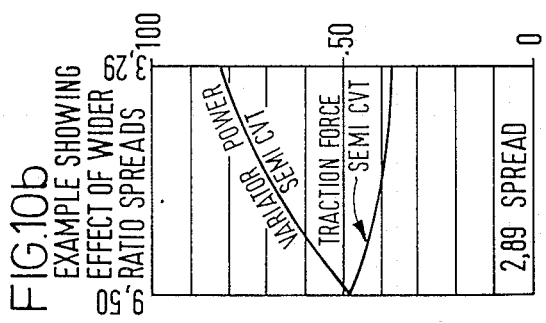

Turning now to FIGS. 9 and 10 the former shows how overall ratio spreads vary with different fixed drive ratios for specific types of epicyclic clusters and how, for example, the three ratios shown in FIG. 10 were selected.

FIG. 10 shows graphically how the ratios of a three variable mode semi-CVT, for example, that described above with respect to the embodiment shown in FIG. 5, abut to produce an extended stepless ratio spread. Also, it shows typical reductions in traction forces (or nett belt loading) and the power transmitted by semi-CVT variators compared with direct variators.

Figure 11:
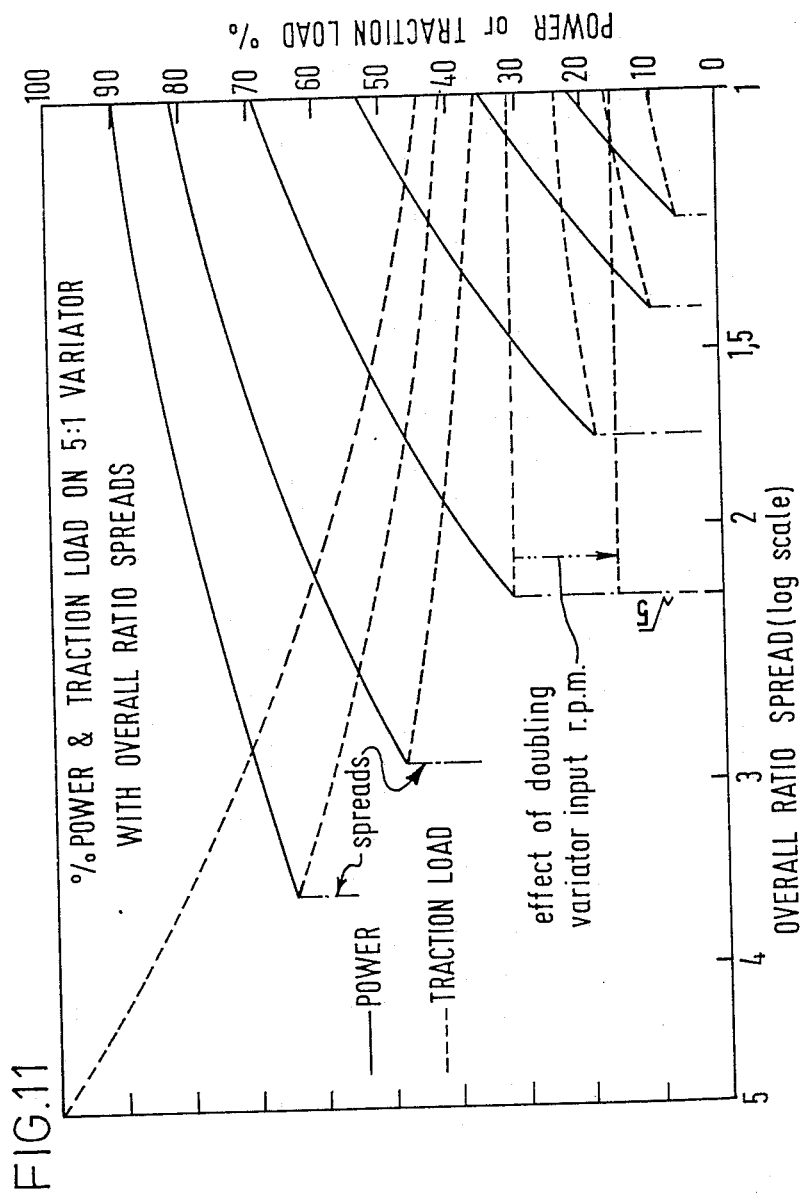

Here, FIG. 11 shows a more detailed graphic representation of how the traction forces and power transmitted by variators changes with a reduction in the variable mode spread of semi-CVTs.

FIG. 12 is a graphic representation of the five variable mode sequences described in respect of the second embodiment of FIG. 2. Although all the variable modes have been given the same spread $(d_m)$, the upper and lower rows, that is, the simple and compound epicyclic geartrains, could be arranged to produce dissimilar variable mode spreads between the upper and lower rows.

It is to be appreciated that for semi-CVT engine braking, the transmission may be clutched to the prime mover (engine), to eliminate any turbine/impeller slip which might otherwise be present with just a fluid coupling. In such an arrangement, the stepless nature and wide ratio spread of a transmission in accordance with the present invention will facilitate optimum engine braking.

It is also to be appreciated that the embodiments of FIGS. 1 to 7 described above could have one or more fixed ratios within any variable mode spread, such that a prolonged mid-spread operation e.g. ploughing, could occur in a mechanically more efficient fixed ratio and could be shifted to another fixed ratio, whilst maintaining drive in that variable mode or even from one variable mode to others, covering the incremental change in fixed ratios. Moreover, the fixed ratio gears can be rotatably mounted on a rotatable element and preselected by simple toothed clutches, prior to final engagement via wet clutching the rotatable element to a shaft.

In order to protect the variators from damage when starting from rest during drive take-up, it is to be appreciated that their respective inputs can be located upstream of the take-up means, such that they are already rotating and will continue to rotate during take-up, with the take-up means preferably being located in the fixed ratio portion of the drive.

In FIG. 13, there is shown a much simplified arrangement for a sheave-type, 2-variable mode unit operating on the rewind principle and utilising a wet clutch drive take-up which is sited in the fixed ratio portion of the drive.

FIG. 14 also shows a simplified unit which is similar to that shown in FIG. 13, except that it incorporates a Hayes/Perbury-type variator.

As to control, it is envisaged that a third, left foot pedal may be provided in an associated vehicle, to provide an optional ratio override for facilitating high engine revolutions for immediate, high power application or engine braking and may subsequently be used to activate an exhaust brake under closed throttle conditions.

What is claimed is:

1. A variable ratio power transmission comprising a variator and a geared drive operable in parallel along respective loading paths which unite at at least one gearset, whereby the power transmitted by the variator, in use, is less than the total input power to the transmission.

2. A transmission according to claim 1, wherein the variator is rewindable between its ratio extremities of operation to begin a successive variable mode, while full power drive is maintained through an associated geartrain at substantially the same overall transmission ratio, thereby facilitating substantially stepless transition between successive modes.

3. A transmission according to claim 1, wherein input to the variator is switchable between its drivable elements at the ratio extremities of operation thereof to begin a successive variable mode, whilst full power drive is maintained through an associated geartrain at substantially the same overall transmission ratio, thereby facilitating substantially stepless transition between successive modes.

4. A transmission according to claim 3, wherein the speed of the drivable element of the variator to which input power can be switched, is synchronisable with the speed of the associated input element.

5. A transmission according to claim 1, wherein power drive to the variator at its ratio extremities of operation is switchable to another variator of the transmission at its opposed ratio extremity of operation to begin a successive variable mode at substantially the same overall transmission ratio, thereby facilitating substantially stepless transition between successive modes.

6. A transmission according to claim 1 including gearing means for producing different variator loadings for different ratio ranges of the transmission.

7. A transmission according to claim 1 including a fixed ratio drive which is substantially equal to the ratio extremities of adjacent variable modes.

8. A transmission according to claim 7, wherein the fixed ratio drive is operable whilst the variable modes are being primed.

9. A transmission according to claim 1, wherein the ratio spreads of successive variable variator modes are substantially the same.

10. A transmission according to claim 1 including a range change gearset for permitting repetition of at least one variable variator mode at a different output speed, thereby steplessly extending the overall ratio spread of the transmission.

11. A transmission according to claim 1 including take-up means for take-up-from-rest operation of the transmission.

12. A transmission according to claim 11, wherein said take-up means comprises a clutch.

13. A transmission according to claim 11, wherein said take-up means comprises a fluid flywheel.

14. A transmission according to claim 1 including a flywheel-sited mechanical clutch for take-up-from-rest operation.

15. A transmission according to claim 1 including a wet clutch for take-up-from-rest operation.

16. A transmission according to claim 1, wherein an increment is provided between respective variable and fixed ratio modes.

17. A transmission according to claim 1, wherein an increment is provided between adjacent variable modes.

18. A transmission according to claim 1 including a final, fixed gear ratio for unloading the variator.

19. A transmission according to claim 1, wherein adjacent variable modes overlap.

20. A transmission according to claim 1 including an hydraulic power source which can be disconnected in any fixed ratio mode.

21. A transmission according to claim 1 including an epicyclic reduction gearset for providing an extra low variable mode.

22. A transmission according to claim 1 including a stepped pinion compound epicyclic gearset for switching the variator output from the smaller to the larger of two optional sungears of the gearset, to reduce the ratio thereof and alleviate reduction in the spread of the variable mode which would otherwise result from an increase in the output speed range through increasing the speed of the geared input to the epicyclic gearset.

23. A transmission according to claim 1 including a stepped planet compound epicyclic gearset whose larger sungear can be grounded to produce a reversed output to that of the associated carrier output.

24. A transmission according to claim 1, wherein the variator input can be disconnected by means of a conventional take-up clutch, to permit inter-mode, stepped gearshifts to be carried out manually.

25. A transmission according to claim 1 including at least one fixed ratio drive incorporated within the ratio spreads of the variable modes of the transmission.

26. A transmission according to claim 1, wherein each gearset at which the loading paths unite is an epicyclic gearset.

27. A transmission according to claim 1 including clutch means for effecting clutching at substantially zero speed differential between respective elements of the transmission.

28. A transmission according to claim 1, wherein the or each gearset is arranged to provide complementary ratio ranges for facilitating stepless abutment between respective operating modes of the transmission.

29. A transmission according to claim 1, wherein the final, shallowest ratio outputs are unity and of like rotation to the input.

30. A transmission according to claim 1, wherein the input to the variator is located upstream of drive take-up means, so that the variator rotates prior to and during take-up.

31. A transmission according to claim 30, wherein said take-up means is located in the fixed ratio portion of the drive.

* * * * *